UNITED STATES PATENT OFFICE.

JACOB REESE, OF PITTSBURG, PENNSYLVANIA.

MANUFACTURE OF WINDOW AND PLATE GLASS.

SPECIFICATION forming part of Letters Patent No. 396,511, dated January 22, 1889.

Application filed August 8, 1887. Serial No. 246,410. (No model.)

*To all whom it may concern:*

Be it known that I, JACOB REESE, a citizen of the United States, residing at Pittsburg, in the county of Allegheny and State of Pennsylvania, have invented a certain new and useful Improvement in the Manufacture of Window and Plate Glass; and I do hereby declare the following to be a full, clear, and exact description of the invention, which will enable others skilled in the art to which it appertains to make and use the same.

What is known as "window-glass" is made by blowing glass into a cylinder, then cutting the ends of the cylinder off, splitting and flattening the cylinder, and annealing the plate, after which it is cut into suitable sizes, and is ready for sale and use. What is known as "plate-glass" is manufactured by depositing molten glass on a plate or table and flattening it by means of a roller passing over it. The plate is then annealed, ground, polished, and cut into suitable sizes, and is ready for use. In both these methods the glass is operated on while it is in contact with the chilling atmosphere, and in the manufacture of plate-glass it is operated on by the plate-table and roll, all of which are of a much lower temperature than the glass, which has the tendency to make the glass rough and uneven on its surface, which requires costly grinding.

Glass is very sensitive to heat and cold. When the molten glass is deposited on the table or plate, as above described, the plate being much colder suddenly chills the glass and contracts it in spots, which causes blotches with intervening depressions, thus making a rough surface. The cold air also produces the same effect in degree. The cold air striking the glass chills its surface, and the mass being hotter in the center the surface is contracted in blotches and is made rough from this cause.

My invention is designed to obviate these difficulties; and it consists in subjecting glass to a rolling operation while maintained at a uniform temperature. By this means the surface of the glass is of the same degree of temperature as the center; hence the contraction is uniform and blotches are avoided.

It also consists in subjecting the glass to a rolling operation while the glass and the rolling apparatus are maintained at the lowest temperature at which the glass is ductile, thus avoiding any chilling from the rolls or cold air while rolling.

My invention also consists in forming molds, slabs, or plates from molten glass, and then subjecting the glass to a rolling operation while maintained at a temperature just above its lowest point of ductility, so that whatever blotches or roughness may be produced in forming the slabs, molds, or plates will be eliminated by the final rolling operations at the lowest temperature at which the glass is ductile.

In the practice of this invention I pour molten glass into a mold so as to form a slab of any desired thickness, width, and length; or the molten glass may be emptied onto a table and flattened out to the desired thickness by a roller being pressed over it, as in the manufacture of plate-glass. The slab, mold, or plate so formed is then put into a furnace or heating-chamber, which is maintained at a temperature of or near the lowest point of ductility of glass. In this furnace or rolling-chamber is placed a rolling apparatus capable of reducing the glass in thickness. This rolling apparatus is provided with a reversing motion. The whole apparatus, being in the heated chamber, is kept continuously at the lowest uniform temperature at which the glass remains ductile. This rolling apparatus may be provided with an automatic feeding-table; or the glass may be handled with tongs or hooks, as plate-iron is now rolled.

I do not wish to limit this invention to the use of any special form of furnace or arrangement of rolling apparatus; but I prefer to use the furnace and rolling apparatus set forth in an application filed by me August 8, 1887, Serial No. 246,410.

When a glass mold, slab, or plate is placed in the furnace and the temperature has been reduced to the desired degree, the glass is passed into the rolls and its thickness is reduced. The rolls are then reversed, the screws tightened, and the glass is passed through the rolls in the other direction, and thus by a succession of passages the glass is reduced to the desired thickness, and is then run into the annealing-oven, annealed, trimmed, and is ready for use as window-glass; or it may be ground and polished for plate-glass. In rolling the glass care should be taken to keep the furnace at the lowest temperature at which the glass is ductile, in order to make the glass as solid as possible; and in rolling the last passes should be quite light—that is to say, the screws should be tightened but very little on the last passes, in order that the plate may be finished as smooth as possible.

Instead of having the rolls in the furnace, a furnace may be placed at each side of the rolls, so that the glass would pass from one furnace into the rolls and from the rolls pass into the other furnace. In this case the rolls should be heated in any suitable manner so as to keep them at the proper temperature; but I prefer having the rolls in the center of the furnace with sufficient room on each side of them for the plate to pass out of the rolls without coming in contact with the end of the furnace.

Window-glass manufactured by this process will possess a fine finish and will be much cheaper than blown window-glass.

Plate-glass manufactured by this process will be produced much cheaper, because by rolling the plates while both the glass and the rolling apparatus are maintained at a uniform temperature at the lowest point of the ductility of the glass the surface of the plate will be much smoother than that made by the old method of rolling the plate while subject to contact with the cooling air and irregular temperature of the plate and roll, and will not require as much grinding.

I do not wish to limit this invention to the use of any peculiar form of furnace, nor to any special method of heating the same, nor to any peculiar relation between the furnace and the reducing-rolls, but claim, broadly, as my invention subjecting glass to a rolling operation while maintained at a uniform temperature, and prefer that its temperature shall be as near its lowest point of ductility, and that the rolls shall be maintained at the same temperature as the glass, or a little below it.

The degree of temperature of lowest ductility of glass will vary with the chemical composition of the glass, as it is well known that some glass will melt at a much lower temperature than another, and so the lowest point of ductility of glass will vary with its chemical composition.

The lowest temperature of ductility of any heat or batch of glass can readily be determined by placing a sample in the furnace and lowering the temperature to the lowest point at which it will remain sufficiently ductile to roll. Then the heat or batch may be rolled at that temperature or a few degrees above it.

The rolls may be made of steel, chilled iron, vulcanized rubber or any material which will not be affected injuriously by the heat, and which will be capable of sustaining a highly-polished surface.

The glass should be rolled at the lowest temperature possible, as the lower the temperature at which it is finished the higher and finer will be its surface-finish.

What I claim as my invention, and desire to secure by Letters Patent, is—

1. The process of manufacturing window and plate glass, which consists in subjecting the glass to a rolling operation while the glass and the rolling apparatus are inclosed within a furnace or chamber which is maintained at or near the lowest temperature the glass is ductile at.

2. The method of manufacturing window and plate glass, which consists in forming molten glass into plates, slabs, or molds, then placing the plates, slabs, or molds in a furnace, and then subjecting the glass to the action of rolls until it has been reduced to the desired thickness while the temperature of the glass and the rolls during the operation is maintained at or near the lowest degree the glass is ductile at.

JACOB REESE.

Witnesses:
WALTER REESE,
C. C. LEE.